Aug. 11, 1942.  B. L. DONALD  2,292,746
CABLE CLAMP
Filed July 27, 1939  2 Sheets-Sheet 1

Inventor
BRUCE L. DONALD,
By Bailey & Parsons
Attorney

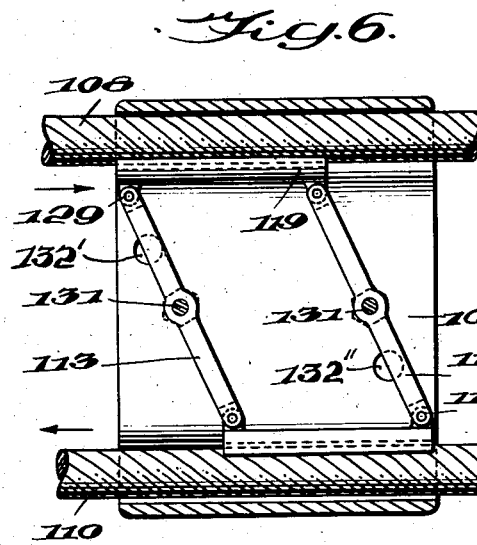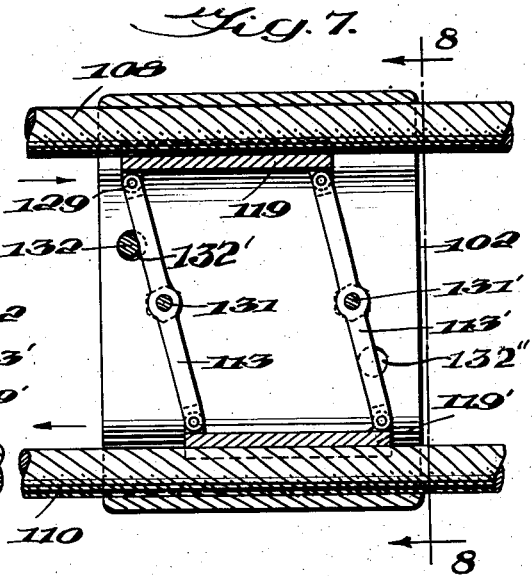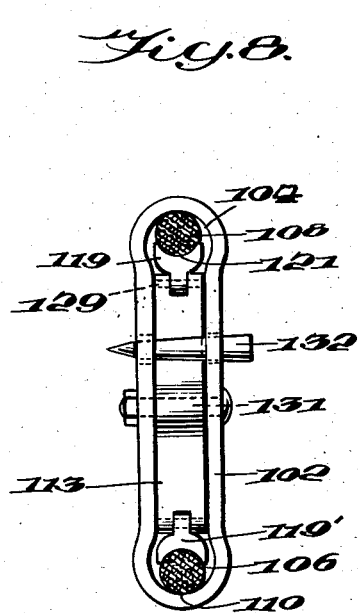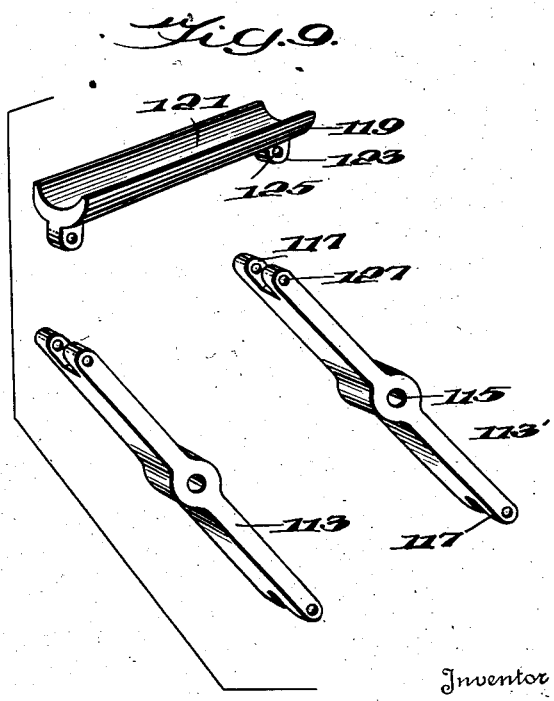
Inventor
BRUCE L. DONALD

Patented Aug. 11, 1942

2,292,746

UNITED STATES PATENT OFFICE 2,292,746

CABLE CLAMP

Bruce L. Donald, Niagara Falls, N. Y., assignor of one-half to Cleo E. Boyd, North Tonawanda, N. Y.

Application July 27, 1939, Serial No. 286,923

18 Claims. (Cl. 24—134)

This invention relates to cable clamps for use on guy wires, stays and the like. Particularly, the invention concerns double action clamps holding a loop in the end of a cable by engaging the standing part and the free end of a cable, the clamping action being provided by the tension of the cable.

One of the objects of the invention is to provide a cable clamp engageable with relatively large areas of a cable along its length. Considerable difficulty has been incurred in using clamps having pivoted cams, levers and the like which engage a cable at or adjacent a single point or points wherein the wire is bent, "crimped" or "bitten" in a limited, local area. Accordingly, another objective is to provide a relatively long wire-engaging member which is forced by cam action against a cable.

According to one of the concepts of the invention, an object is to provide a cam driven cable clamping member which, in all positions, is parallel to the cable. A further objective is to provide a clamp suitable for use on cables having a wide range of diameters.

Another object is to provide a cable clamp which entirely surrounds a cable when in use and which may be placed on the standing part of the cable to provide a bight or loop therein without necessarily roving a free end of the cable therethrough.

It is also now proposed to provide cable engaging means which may be inserted into the body of a clamp in any one of a plurality of relationships to prevent relative movement between the cable and clamp in either of two directions.

In order to provide more of a cable gripping action than would normally result from the tension of the cable, it is also proposed to provide auxiliary wedging means which also prevent release of the cable engaging members.

Still again, an object is to provide auxiliary wedging means for fixedly holding the cable engaging members in any one of a plurality of positions so that the clamp may be used on various sized cables.

A further object of the invention is to provide means for driving a cable engaging member into operative position, such means, in operation, being movable in a direction transverse to the longitudinal axis of the cable and being readily accessible.

So that the device may be readily packed and transported, it is herein proposed to provide a substantially flat clamp and, since it is also intended that the clamp is to be used by linemen sometimes in precarious conditions, it is further proposed to form the main parts thereof symmetrically so as substantially to obviate the selection and fitting of parts.

These and other objects, such as, the provision of a simple, rugged, non-destructable article, the parts of which may be economically forged or cast and which need no machining or expensive finishing, will appear from the following specification and drawings, in which:

Fig. 6 is a vertical section of a second embodiment of the invention, showing the cable engaging members before clamping action has taken place;

Fig. 7 is a vertical section similar to Fig. 6, but showing the clamp in final operative position;

Fig. 8 is a section taken along the lines 8—8 of Fig. 7; and

Fig. 9 is a projection, in perspective, of the basic moving elements of Figs. 6 to 8, inclusive, before assembly.

Figure 1:
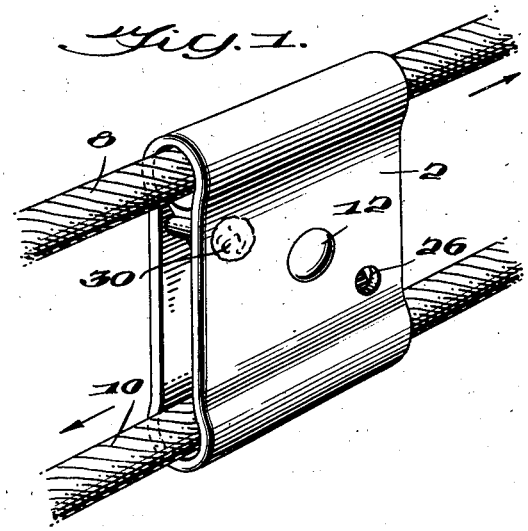
Fig. 1 shows one embodiment of the invention in perspective.
Figure 4:
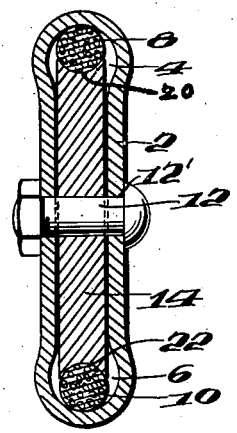
Fig. 4 is a section along the line 4—4 of Fig. 3 looking in the direction of the arrows.

Referring first to Figs. 1 to 5, inclusive, the clamp is formed of body member 2 shaped as an elongated O, and preferably being cast from strong metal, such as iron. Open-ended channels 4 and 6 are formed in the upper and lower sides of the body 2 for accommodating, respectively, the free end 8 and the standing part 10 of a cable. When the clamp is applied to a guy wire, the free end is first passed through channel 6 and then back through channel 4 to provide a loop (not shown) to which may be engaged an I or J bolt, or shackle (not shown). Tension is applied to the respective parts of the wire in the direction indicated by the arrows.

Pintle bolt 12, which passes through the center opening 12' of the body, pivotally supports a double-ended cam piece 14, the opposed ends 16 and 18 of which are provided, respectively, with concave grooves to provide seats 20 and 22, the surfaces of which may be roughened or toothed (not shown). It should be noticed that the opposed ends 16 and 18 are laterally offset on opposite sides of the pintle bolt and that each of the ends is, in profile, slightly convex so as to provide almost flat engagement with the cable.

Wedge holes 24 and 26 are bored through the walls of the body for accommodating, in either one, a wedge-shaped pin 23, the pointed end of which should be upset as indicated at 30 after the wedge has been driven home. As indicated best in Figs. 2, 3 and 5, wedge hole 24 is laterally offset from the pintle bolt 12 a greater distance than is hole 26 for reasons to be later set forth.

Figure 2:
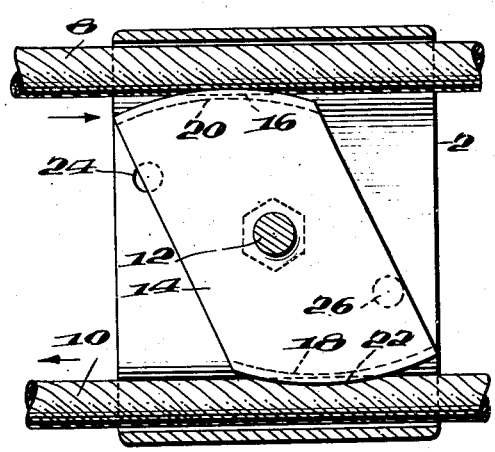
Fig. 2 is a vertical section of the clamp shown in Fig. 1 before clamping action has taken place.
Figure 3:
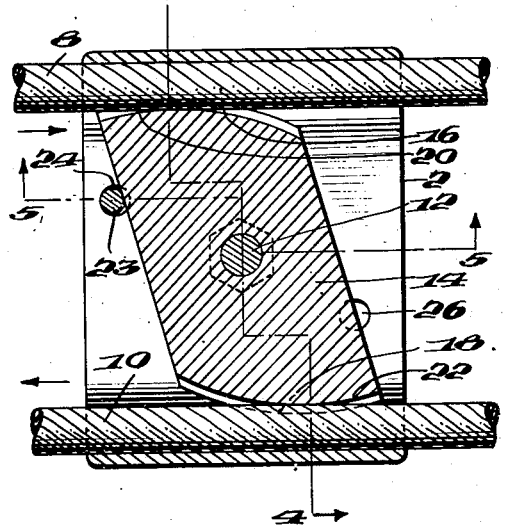
Fig. 3 is a vertical section similar to Fig. 2, but showing the assembly in final operative position.
Figure 5:
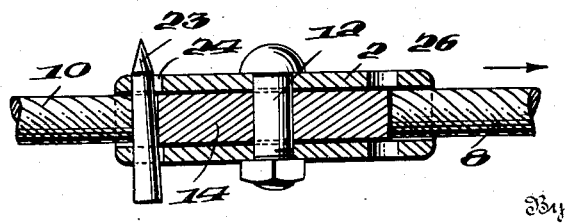
Fig. 5 is a section along the line 5—5 of Fig. 3 looking up from the underside in the direction of the arrows.

Before tension is applied to the cable, the double cam piece is in the substantially free position shown in Fig. 2. Then, as tension is applied to the respective parts of the cable, the double cam piece is thereby caused to rotate in a clockwise direction until both ends are engaged tightly against the cable parts. In Fig. 3 it should be noted that the cable is in nowise bent, cut or deformed, that a flat end-to-end engagement is had with the entire length of the inner sides of the clamp body 2, and that an extremely long surface is presented to the cable by the ends of the double-ended cam piece 14.

Depending upon the size of the cable, one or the other of the sides of cam piece 14 will be almost past either of the wedge holes 24 or 26. The cam piece 14 is finally driven tight against the cable by driving wedge pin 23 through the selected holes, after which the pointed end is upset, as shown at 30, for preventing angular return of the cam piece to a free position. This final tightening operation is thus accomplished by driving the wedge pin in from the side, a manner of great convenience when working from a ladder.

When the clamp is to be mounted on a cable affording no available free end, the double-ended cam piece should first be removed by taking out pintle bolt 12, after which the cam piece may be slid out one of the open ends of the body 2. Next, a loop is gathered in the cable and passed through the body, after which the cam piece and pintle bolt are replaced.

The embodiment disclosed in Figs. 6 to 9 has a body 102 and upper and lower channels 104 and 106 similar to elements 2, 4 and 6 of Figs. 1 to 5 for engagement with the free end and standing part 108 and 110, respectively, of a cable.

The cable engaging element, however, is in the form of a parallelogram, comprising the identical bars 113 and 113', each pivoted through a central opening 115 to the body 102. Bars 113 and 113' are provided with a slot 117 at each end for tandem pivotal engagement with the straight shoe pieces 119 and 119'. The shoes are also identical and each has, on one side thereof, an open channel seat 121 for engagement with the cable. The working faces of the channel seats 121 may be toothed or roughened (not shown) for non-sliding engagement against the cable.

As shown best in Fig. 9, the shoes have projections 123 which, in turn, have eyelets 125. Eyelets 127 are bored through the slotted ends of the bars so that when pintles 129 are engaged through the eyelets a collapsible parallelogram is formed. Pintle bolts 131 are passed through openings in the body and engaged through their respective central openings 115 in the bars. A wedge 132 selectively insertable through openings 132', 132'' is used in the manner previously set forth relative to Figs. 1 to 5. In either modification, the wedge and holes therefor may be round (as shown), square or otherwise geometrically shaped in cross section (not shown).

The parallelogram modification is used similarly to the double-ended cam arrangement, but in operation shoes 119 and 119' always stay parallel to each other and to the cable so that an absolutely flat engagement takes place with the cable for the entire length of the shoes.

It is clear that no amount of tension on the cable can place a purely local pressure on the strands because of the great length of the parallel gripping elements, and that the gripping elements must remain parallel regardless of the size of the cable upon which the clamp is attached.

I claim:

1. A cable clamp, comprising a body having opposed, substantially straight cable-receiving elements, and a double-ended cable engaging member pivoted intermediate its ends to the body intermediate said elements, said member having two opposed corners, the distance between which is substantially greater than the distance between said elements.

2. A cable clamp, comprising a body member provided with at least one channel for accommodating a cable therein, cam means pivoted to said body and movable in one plane by movement of said cable through said body member to engage said cable between said cam means and said body, and wedge means engageable with said body member and said cam means for urging said cam means further against the cable.

3. A cable clamp as claimed in claim 2, said wedge means being movable in another plane.

4. A cable clamp as claimed in claim 2, said wedge means being movable in a plane transverse to the plane of movement of said cam means.

5. A cable clamp, comprising a body member having opposed, substantially straight cable-receiving elements, a double-ended cam member pivoted intermediate its ends to the member intermediate said elements and swingable in a plane substantially parallel to said elements, said member having an opening therethrough, and a wedge engageable through said opening with one side of said member.

6. A substantially flat-sided cable clamp, comprising a body member formed of metal in the shape of an elongated O and having a central opening through the side walls thereof, a pintle engaged through said opening, and a double-ended cam pivoted at its center on said pintle, said cam being a flat, solid piece of metal and having two opposed parallel straight side edges, the working faces at the ends of said cam being curved and being grooved longitudinally, the distance between two opposed corners of said cam being greater than that between the other two opposed corners.

7. A cable clamp as claimed in claim 6, the distance between the first-mentioned opposed corners being substantially greater than the distance between the inner ends of said body member.

8. A cable clamp as claimed in claim 6, the side walls of said body member having a second opening therethrough substantially opposite one side edge of said cam when said cam is in cable-engaging position, and a wedge-shaped pin engageable through said opening with said side edge.

9. A cable clamp as claimed in claim 6, the upper and lower ends of said body member being enlarged with respect to the distance between the side walls whereby to provide cable channels.

10. A cable clamp as claimed in claim 6, the side walls of said body member having a second opening therethrough substantially opposite one side edge of said cam when said cam is in cable-engaging position, a wedge-shaped pin engageable through said opening with said side edge, and a second opening spaced slightly inwardly of one of said side edges whereby said cam may be driven tightly against said cable by successive, step-by-step insertion of said pin.

11. A cable clamp, comprising a body member having a cable-retaining element thereon, an arm pivoted to said member, and a cable-engaging shoe pivoted to said arm.

12. A cable clamp, comprising a body member, an elongated, substantially straight cable-retaining element on said member, an arm pivoted to said member, and an elongated, substantially straight cable-engaging shoe pivoted to said arm.

13. A cable clamp, comprising a body member having a cable-retaining element thereon, a pair of arms pivoted to said member at points relatively remote from said element, and a shoe pivotally attached to the free ends of said arms, the arrangement of said pivotal points, arms and shoe being such that when said shoe is in operative position to engage a cable between the working face thereof and said element at least part of said shoe is parallel to at least part of said element.

14. A cable clamp, comprising a body member having an elongated cable-retaining element thereon, a pair of identical arms pivoted to said member equidistantly from said element, and an elongated cable-engaging shoe pivotally attached to the ends of said arms so that when said shoe is in cable-engaging position said shoe and said element are substantially parallel.

15. A cable clamp, comprising a body member having an opposed parallel pair of substantially straight cable-retaining elements thereon, a pair of identical arms pivoted at their mid-points to said member equidistantly between said elements, and a pair of identical cable-retaining shoes, each of which is pivotally attached to one end of each of the arms, the arrangement being such that the arms are substantially parallel to each other in all pivoted positions, and the shoes and elements are, at all times, substantially parallel.

16. A cable clamp, comprising a substantially flat body member formed of metal in the shape of an elongated O, a spaced pair of pivots extending through said member along the horizontal median line thereof, a pair of identical arms, each of which is pivotally attached at its middle to one of said arms, and a pair of identical cable-engaging shoes, each of which is pivotally attached to one end of each of said arms whereby to provide a collapsible parallelogram.

17. A cable clamp as claimed in claim 16, each of said shoes having a longitudinal groove along the working face thereof.

18. A cable clamp as claimed in claim 16, said body member having a plurality of transverse openings extending thereacross through the side walls thereof, and wedge means engageable, selectively, through said holes whereby to urge said arms towards a rectangle-inscribing position.

BRUCE L. DONALD.